United States Patent [19]

Sule

[11] 4,175,648
[45] Nov. 27, 1979

[54] DEVICE FOR THE BRAKING OF BICYCLES

[76] Inventor: Sandor Sule, Steigstrasse 77, CH 8200 Schaffhausen, Switzerland

[21] Appl. No.: 844,042

[22] Filed: Oct. 20, 1977

[51] Int. Cl.² .......................... B62L 1/10; B62L 3/02
[52] U.S. Cl. .................................... 188/344; 188/370
[58] Field of Search ............... 188/24, 72.5, 344, 361, 188/369, 370, 196 A, 196 M; 92/34, 40, 42, 43, 46; 138/121, 173

[56] References Cited

U.S. PATENT DOCUMENTS

| 2,050,682 | 8/1936 | White | 188/196M |
| 2,346,758 | 4/1944 | Hughes | 188/344 |
| 2,844,228 | 7/1958 | Schnell | 92/42 |
| 2,966,964 | 1/1961 | Brueder | 188/370 |
| 3,589,481 | 6/1971 | Motsch et al. | 188/370 |
| 3,776,333 | 12/1973 | Mathauser | 188/344 |

FOREIGN PATENT DOCUMENTS

| 101167 | 1/1898 | Fed. Rep. of Germany | 188/24 |
| 817543 | 10/1951 | Fed. Rep. of Germany | 138/121 |
| 2607080 | 10/1976 | Fed. Rep. of Germany | 188/344 |
| 622294 | 5/1927 | France | 188/361 |
| 783659 | 7/1935 | France | 188/344 |
| 904044 | 10/1945 | France | 188/344 |
| 581556 | 11/1926 | Switzerland | 188/344 |
| 164156 | 6/1921 | United Kingdom | 92/46 |

Primary Examiner—Edward R. Kazenske
Attorney, Agent, or Firm—Hane, Roberts, Spiecens & Cohen

[57] ABSTRACT

A braking device for a bicycle comprising brake shoes positioned on opposite sides of a wheel of the bicycle for being brought into operative contact with the wheel to effect braking of the bicycle under the action of a movable brake handle and in opposition to a restoring spring. A hydraulically actuable pressure member is operatively coupled to each brake shoe to displace the same to its braking position and a hydraulic cylinder is operatively coupled to the brake handle for being actuated thereby. A hydraulic circuit connects the hydraulic cylinder and the hydraulically actuable pressure members for pressurizing the latter when the hydraulic cylinder is actuated by the brake handle.

2 Claims, 4 Drawing Figures

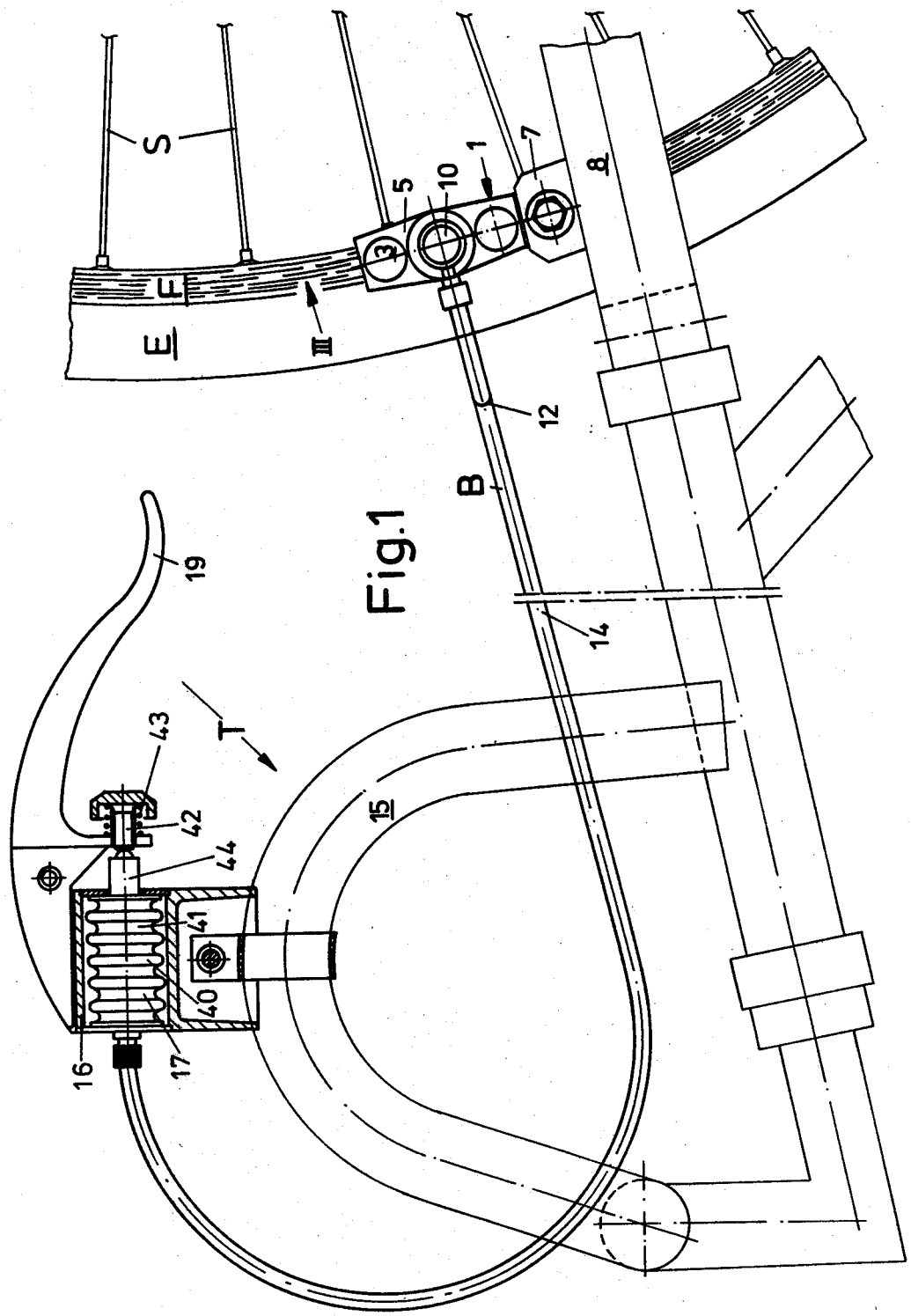

DEVICE FOR THE BRAKING OF BICYCLES

FIELD OF THE INVENTION

This invention relates to a device for the braking of bicycles having brake shoes which are adapted to be brought against the wheel while charging a return motion force accumulator, said brake shoes being adapted to be actuated by at least one brake handle.

PRIOR ART

Ordinary bicycle brake devices have an actuating hand lever which is arranged on the steering bar of the bicycle, brake shoes arranged in the vicinity of the wheels and Bowden cables which connect the hand lever and brake together.

For automotive vehicles hydraulic brake systems are known with respect to which it has always been assumed up to now that they are unsuitable for bicycles in view of the expense and their complicated construction.

SUMMARY OF THE INVENTION

The inventor has directed himself to the present problem with the intention of creating a new brake device for bicycles of the aforementioned type which utilizes the advantages of the known automobile brake systems.

The solution of this problem is based on the idea that hydraulically movable pressure members act on the brake shoes and are connected to a fluid-pressure system which terminates at its other end in at least one hydraulic system adapted to be actuated by the brake handle.

It has been found particularly advantageous to develop the main brake or hydraulic cylinder and/or the brake-shoe pressure members or wheel brake cylinder itself with a variable volume.

By means of this device it is now possible to carry out accurately acting braking processes without the disturbances which are known in connection with mechanical brakes. The brake system of the invention can be manufactured inexpensively, is easy to maintain and can be applied even subsequently to any type of bicycle—with or without auxiliary motor; in accordance with the invention, the hydraulic cylinders are constructed as bellow members, preferably with rings of material which engage into and are displaceable with respect to each other and form a liquid-tight wall with each other. This embodiment has the advantage that there are no losses of liquid in the region of the "piston-cylinder" unit. There is thus involved a completely closed pressure system without leakage.

The inside of the cylinder can advantageously also include an additional sealing skin and/or a restoring spring or corresponding force accumulator.

BRIEF DESCRIPTION OF THE DRAWINGS

Other advantages, features, and details of the invention will become evident from the following description of preferred embodiments read with reference to the drawings in which:

FIG. 1 is a side view, partially in section, of the front part of a bicycle having a brake system on the wheel fork which for simplicity is arranged approximately horizontally and therefore turned about 90° from the position of travel;

DETAILED DESCRIPTION

Figure 2:
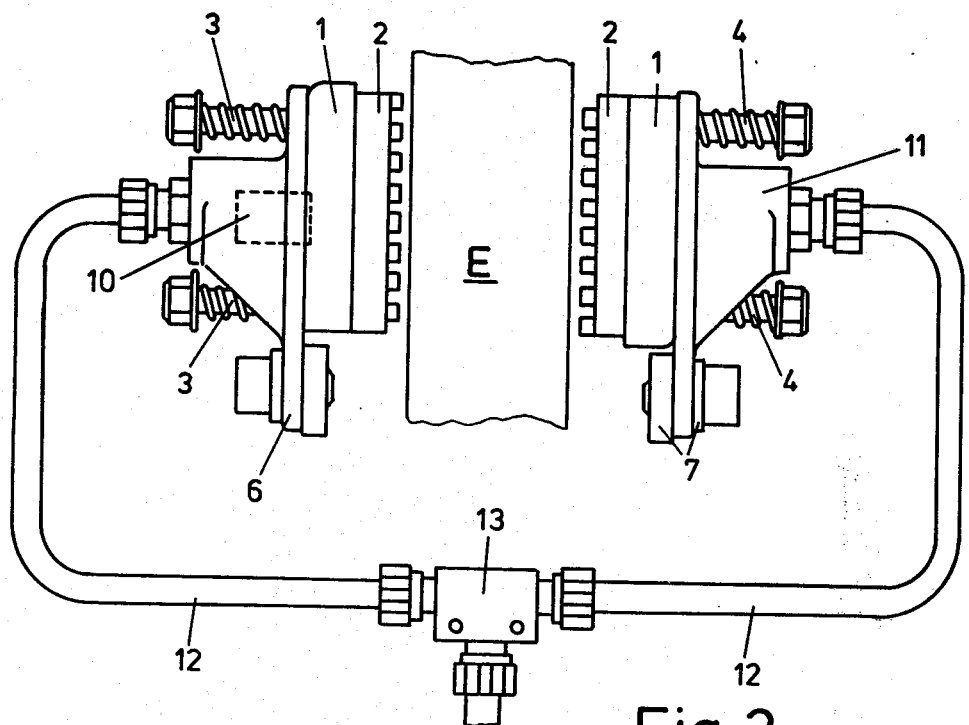
FIG. 2 is a diagrammatic top view of a part of the front wheel together with the brake system.

On both sides of the partially shown rim F borne by spokes S of a bicycle indicated merely by a wheel E there are arranged two brake shoes 1 having rim brake blocks 2 of rubber or the like. The brake shoes 1 are held in their position of rest shown in FIG. 2 by two return springs 4 each arranged around a bolt 3. The return springs 4 are supported in a holding block 5 the lateral carrying arm 6 of which is seated firmly in a lateral strap 7 of the steering frame 8. A brake member 10, arranged in FIG. 2 in a hydraulic cylinder, applies pressure between the bolts 3 against the inner side 9 of the brake shoe 1.

The hydraulic members 10 are connected via liquid conduits 12 with a T-connector 13 and via the latter and a common hose 14 with the main cylinder 17 which is arranged on the steering grip 15 in a brake housing 16.

Figure 4:
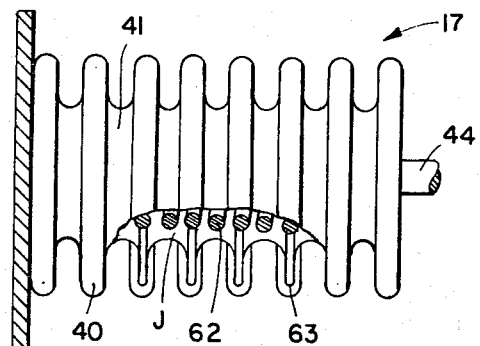
FIG. 4 shows a detail, on an enlarged scale, of a brake member in FIG. 1, partially in section.
Figure 3:
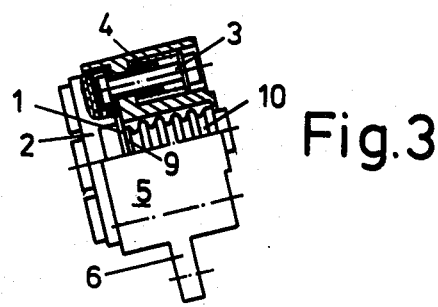
FIG. 3 shows a detail of FIG. 1 partly in section taken approximately along line III in FIG. 1.

The hydraulic cylinders 10, 17 are constructed in the manner of a metallic water hose as seen in FIG. 4 of rings of material 40, 41 which engage each other or of a corresponding bellows part and are thus variable in size axially.

If the brake handle 19 is displaced against the handlebar 15 of the bicycle in the direction indicated by the arrow T, then an adjustable shaft 42 presses against a return spring 43 on an axial pin 44 of the main brake cylinder 17. The volume of cylinder 17 is reduced and a brake fluid B which is contained in the hydraulic system 17-14 12-10 is pumped into the wheel brake cylinders 10. The latter press the brake shoes 1 and brake lining 2 uniformly against the wheel rims F and cause an immediate but gentle stopping of the wheel.

As seen in FIG. 4, a return spring 62 as well as bellows lining 63 which lines the inside of the cylinder 10 are provided within the inner space J of the cylinder 10. The cylinder 17 is similarly constructed.

For the second wheel of the bicycle, not shown in the drawing, a second brake system of corresponding type can be present, the two wheel brake cylinders 10 which are associated with the other wheel being connected either to the same main brake cylinder 17 or to a separate, second main brake cylinder.

The entire brake system requires only the individual parts shown in the drawing; the return of the brake lever 19 after braking can be effected by the return springs 4 via the hydraulic fluid B present in the hydraulic system 17-14-12-10.

As a particular advantage of the brake system, it should be emphasized that ordinary commercially available inexpensive parts can be used. The space taken up is very slight and the weight of the entire device shown for a bicycle—consisting of two wheel brake cylinders 10, a main brake cylinder 17, and the connecting conduits 12 to 14—amounts, for instance, to less than 85 g.

What is claimed is:

1. Bicycle braking apparatus comprising: a first brake shoe positioned adjacent a wheel of the bicycle and displaceable between an inoperative position spaced from the wheel and an operative position in which the first brake shoe contacts the wheel and applies braking force thereto; movable brake handle means mounted on a portion of the bicycle; operation means connecting said brake handle means and said first brake shoe for displacing the first brake shoe to said operative position when the brake handle means is displaced; restoring means for returning said first brake shoe to said inoperative position when the brake handle means is released; said operation means comprising a first hydraulically actuatable pressure member operatively coupled to said first brake shoe for displacing the first brake shoe to said operative position, a hydraulic cylinder operatively coupled to said brake handle means for being actuated thereby, and hydraulic circuit means connecting said hydraulic cylinder and said first hydraulically actuatable pressure member for pressurizing said first hydraulically actuatable pressure member when the hydraulic cylinder is actuated by the brake handle means, each of said first pressure member and hydraulic cylinder comprising a bellows member having variable volume thereof, the bellows members of said first pressure member and said hydraulic cylinders having interior volumes connected by said hydraulic circuit means and being filled with hydraulic brake fluid, each said bellows member comprising a plurality of interconnected annular elements displaceable with respect to one another and constituting a liquid-tight wall, an inner sealing lining within said wall forming said interior volume and a restoring spring coaxially arranged within said inner sealing lining, said handle means comprising a handle portion pivotable between an operative position and an inoperative position, an adjustable shaft operatively connected to said handle portion and movable thereby into an engaging position, said hydraulic cylinder including an axial pin extending therefrom in axial alignment with said adjustable shaft for undergoing axial displacement when said handle portion moves from the inoperative to the operative position for compressing said bellows member of the hydraulic cylinder and concurrent expansion of the bellows member of the first pressure member, said spring within each said bellows member opposing deformation thereof and returning the respective bellows member to initial state with the handle released and returned to inoperative position.

2. The bicycle braking apparatus according to claim 1, further comprising a second brake shoe oppositely aligned with said first brake shoe so that said first and second brake shoes contact said wheel on opposite sides thereof, said operation means comprising a second hydraulically actuable pressure member for pressurizing said second brake shoe, said second hydraulically actuable pressure member also being connected with said hydraulic circuit means to reciprocate said second brake shoe.

* * * * *